June 26, 1962

R. R. TURNER 3,040,911

AUTOMATIC FEEDER

Filed Nov. 27, 1959

INVENTOR.
Ralph R. Turner
BY
Barlow & Barlow
ATTORNEYS.

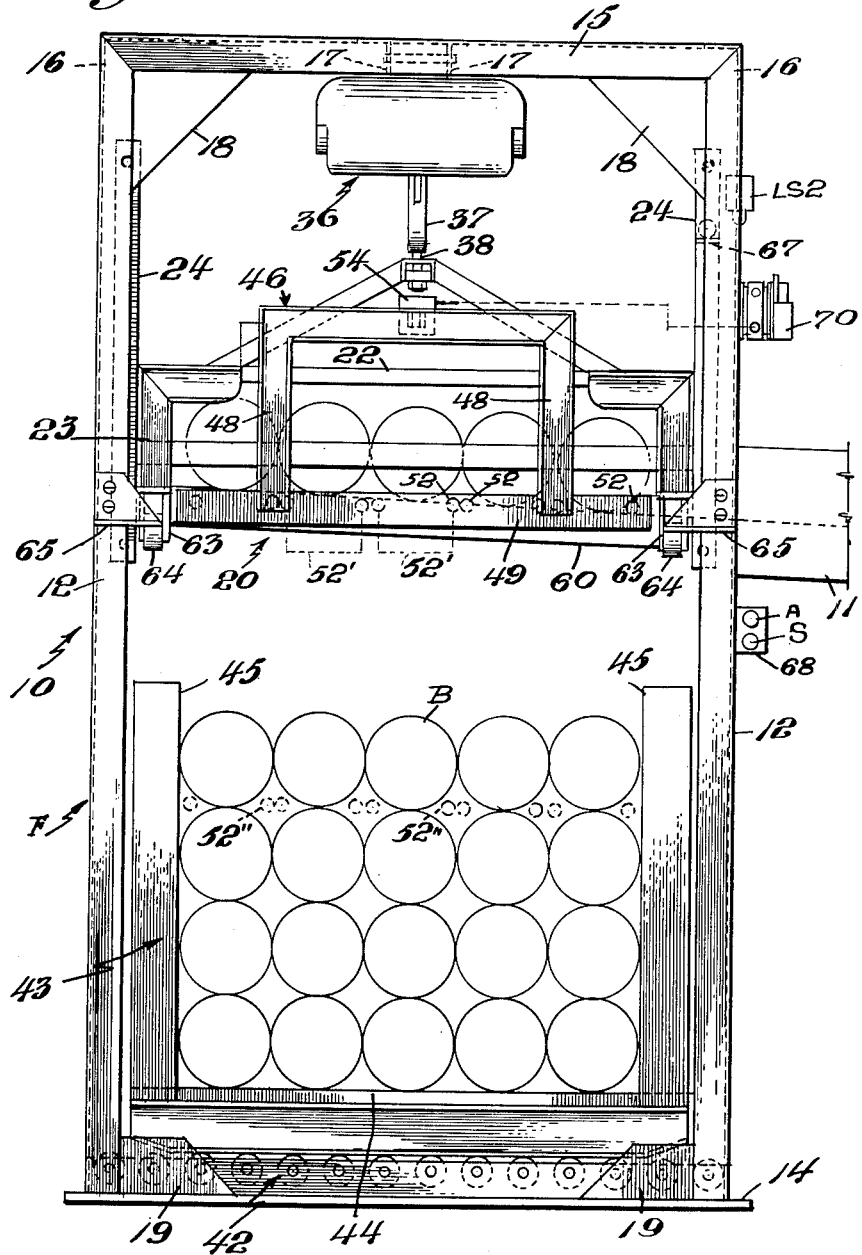

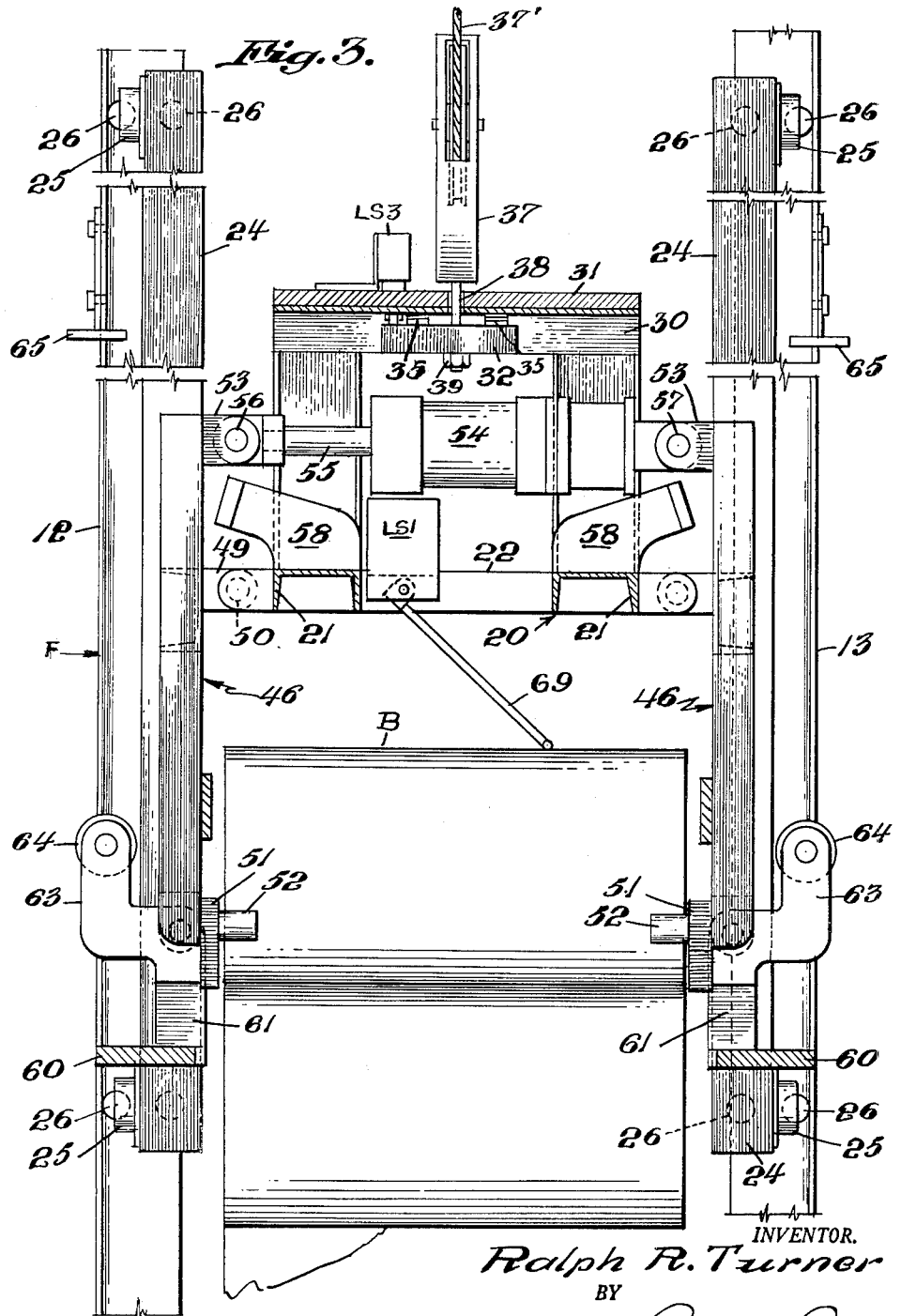

INVENTOR.
Ralph R. Turner
BY
Barlow & Barlow
ATTORNEYS.

INVENTOR.
Ralph R. Turner
BY
Barlow & Barlow
ATTORNEYS

United States Patent Office 3,040,911
Patented June 26, 1962

3,040,911
AUTOMATIC FEEDER
Ralph R. Turner, Warwick, R.I., assignor to United Wire & Supply Corporation, a corporation of Rhode Island
Filed Nov. 27, 1959, Ser. No. 855,698
6 Claims. (Cl. 214—8.5)

This application is a continuation in part of application Serial No. 619,822, filed November 1, 1956, now abandoned.

This invention relates to an automatic feeder, particularly adapted for feeding a relatively heavy cylindrical work piece to a machine for operating thereon.

In the preparation of metal billets for extruding into tubular form, a central bore is made through the billet by a boring operation, or the bore is cast and thereafter machined to predetermined tolerances. Thus in either case, the billet requires a machine operation. The billet is relatively heavy, as by way of example 75 pounds, and it is desirable that metal billets of this weight be mechanically loaded in the machine and automatically advanced to the tools of said machine.

An object of this invention is to provide an apparatus which will operate so as to automatically feed relatively heavy work pieces to a machine to be acted thereon.

A more specific object of the invention is to provide an apparatus which will function to automatically pick up a relatively heavy work piece from a carrier and transfer the work piece to a conveyor to be automatically moved therealong to the machine to operate thereon.

With these and other objects in view, the invention consists of certain novel features of construction as will be more fully described and particularly pointed out in the appended claims.

In the accompanying drawings:

FIGURE 2 is a side elevational view of the apparatus looking thereat from the left of FIGURE 1;

FIGURE 3 is a fragmentary section of the apparatus drawn on a larger scale and illustrating the work engaging elements of the apparatus as having been lowered into engagement with the work;

Figure 1:
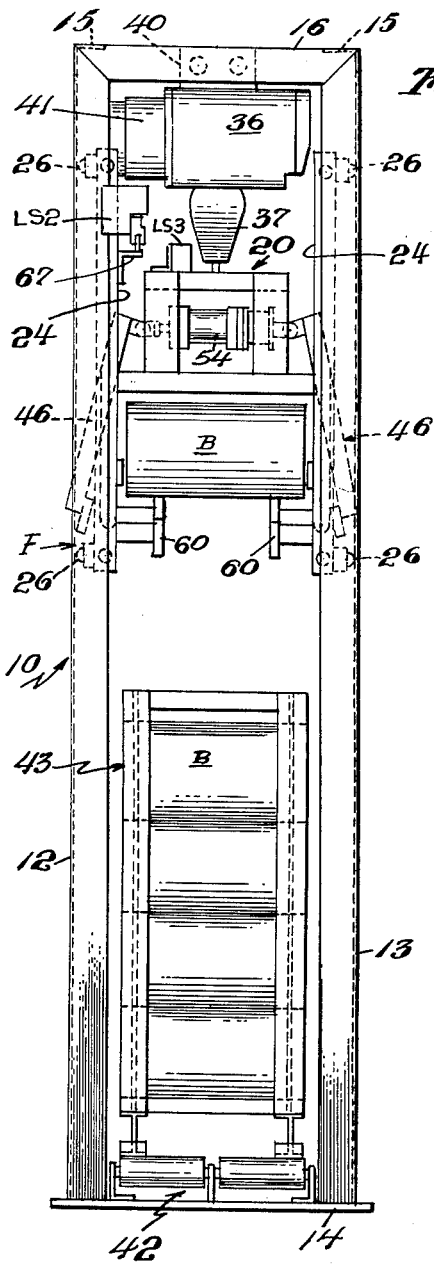
FIGURE 1 is an end elevational view of a feeder apparatus embodying my invention and looking thereat from the delivery end thereof.

The invention is shown as embodied in an apparatus designated generally 10 for use with a machine (not shown) for performing a machine operation on a metal billet to be thereafter extruded into a desired form. The machine may be of any usual known construction wherein the billets to be worked upon are advanced along a track or similar structure 11 (see FIGURE 2) to a tool of the machine. The apparatus comprises an open frame F (FIGURES 1 and 2) having pairs of oppositely disposed uprights 12 and 13 which rise from a common base 14 and are bridged at their upper ends by horizontally extending members 15 and 16. The upper portion of the frame is additionally reinforced by means of a pair of spaced parallel extending cross members 17 (FIGURE 2) which are centrally disposed with respect to members 15 and parallel to member 16. The frame is further reinforced as by means of gusset plates 18 at the upper corners and gusset plates 19 at the lower corners of the frame. The frame is preferably made of angle iron, and the sides of the uprights 12 and 13 face inwardly toward each other and provide tracks along which the work elevating mechanism 20 is guided.

The mechanism 20 to be hereinafter referred to as the elevator is likewise an open frame, preferably made of channel iron, and has a pair of horizontal members 21 (see FIGURES 3 and 4) which extend lengthwise of the frame F and are connected at their ends by right angularly extending members 22 from the ends of which depend vertical members 23 (FIGURE 2). There are four members 23, and they are positioned to be closely adjacent to the inner uprights 12 and 13 of the frame F. A guide 24 (see FIGURES 1, 4 and 5) is positioned adjacent each upright 12 and 13 and is provided at each end portion with a pair of anti-friction bearings 25 from which a ball 26 projects to engage against a side of an adjacent upright. The members 23 are secured to the guides 24 as by means of bolt and nut fastenings 27 (see FIGURES 4 and 5). Thus, the raising and lowering of the elevator mechanism is guided along the uprights 12 and 13 by anti-friction bearings 25 which provide for smoothness of operation.

The upper portion of the elevator 20 has a bar 30 which extends crosswise of the elevator frame and centrally thereof. The bar 30 is made of an inverted channel iron (see FIGURE 7) and reinforced with a plate 31. A block 32 has a central opening 33 therethrough and a blind bore 34 at each side of said opening 33. The block is positioned within the channel 30, and a compression spring 35 is arranged in each bore 34 to engage the bottom thereof and also engage the upper wall of channel 30 so that the block is resiliently biased for movement away from said wall. The channel 30 is attached to a hoist 36 (FIGURES 1 and 2) having the usual lower pulley block 37 connected to the hoist mechanism by a cable 37' (see FIGURE 3). A stud 38 is fastened to the block 37 and extends therefrom to pass freely through said bar 31, channel 30, and through opening 33 in block 32. A nut 39 threadedly engages the stud and provides an abutment against which the block rests. The weight of the elevator will normally maintain the springs 35 in the compressed state and the cable 37' under tension of the weight of the elevator when suspended from the hoist 36. The hoist is pivotally attached to the cross members 17 by a bracket 40 best seen in FIGURE 1 and hangs therefrom. The mechanism of the hoist is operated in a usual manner by a reversable motor 41 (FIGURE 1) which is attached to the hoist housing. Thus the rotation of the motor in one direction will pay out cable to lower the elevator 20, and the rotation of the motor 41 in the other direction will draw in the cable to raise the said elevator.

The lower end of the frame F is provided with a roller track 42 for ease in loading a supply of billets B onto the apparatus. The billets are carried on a pallet 43 which has a platform 44 on which the billets are packed and side posts 45 so as to hold the billets in a particular order of arrangement as will now be described. Referring to FIGURE 2, it will be seen, by way of example, that the billets are loaded in four horizontal rows of five billets in each row. Thus each billet in a vertical row extends one directly above the other. It will be, of course, understood that the number of rows of billets is merely as an example and that there may be more or less rows of billets depending upon the capacity of the machine. It is, however, essential that the billets in the vertical rows be approximately in line with each other. It will be apparent a pallet 43 may be loaded at a point remote from the apparatus and thereafter transported by means of a carrier (not shown) having a platform at the level of tracks 42 whereby the loaded pallet may be pushed off the carrier onto the said tracks 42.

Figure 4:
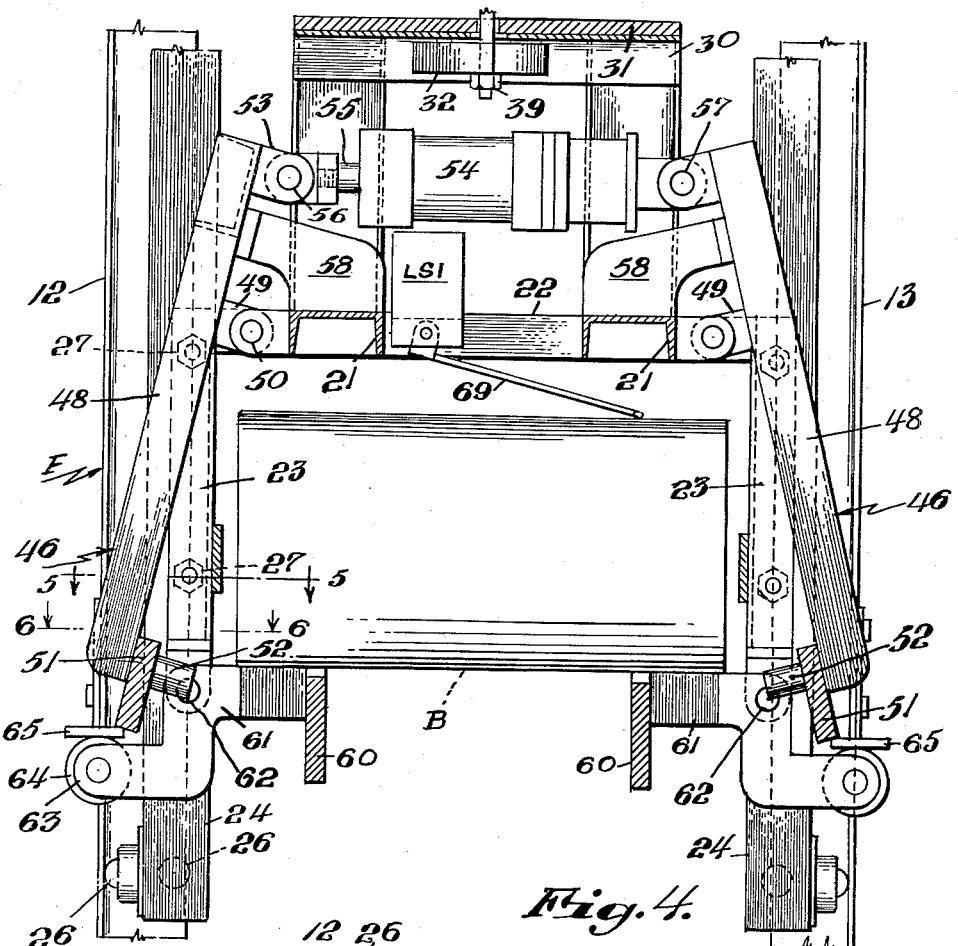
FIGURE 4 is a similar sectional view showing the apparatus in the relation assumed after having elevated the work pieces.
Figure 5:
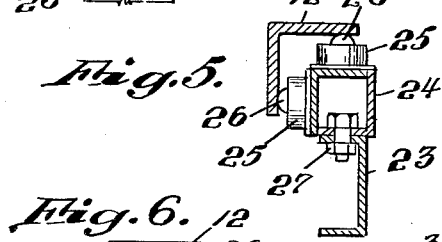
FIGURE 5 is a sectional view taken substantially along line 5—5 of FIGURE 4.
Figure 6:
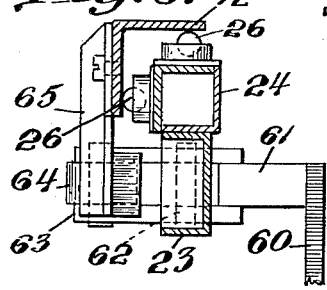
FIGURE 6 is a sectional view taken substantially along line 6—6 of FIGURE 4.

The billets B are loaded onto the elevator by means of a pair of jaws 46, best seen in FIGURES 2, 3 and 4. These jaws are similar to each other with the exception that one is right hand and the other left hand. Each comprises an inverted U-shape frame providing arms 48 (see FIGURES 2 and 4) each having a bracket 49 (FIGURE 4) secured thereto intermediate its ends, which bracket is pivotally attached to member 22 as at 50. A bar 51 is secured to the lower ends of arms 48 and carries pins 52 which project from the inner side of the bar 51. The pins 52 are arranged in pairs (see FIGURE 2) there being one pair for each billet B contained in a horizontal row on the pallet 43. In the present instance, there are five pairs of pins 42. The distance of the space between each pair of pins is indicated by broken line brackets 52' and is slightly less than the diameter of a billet B. Each billet is so located as to be vertically central between each pair of pins 52'. A bracket 53 extends from the upper portion of each frame 46 centrally thereof and is attached to an air cylinder 54, one jaw 46 being pivotally attached to the connecting rod 55 as at 56, and the other jaw 46 being pivotally attached as at 57 to the other end of said cylinder. The arrangement is such as to provide for the movement of the piston rod 55 relative to the cylinder casing, and the cylinder casing being also moved relative to the piston rod, thus providing for equalizing the force applied on the jaws 46. Limit stop abutments 58 are secured to the members 21 and extend therefrom to be in the path of the jaws 46 to be engaged thereby. Upon furnishing air under pressure to one side of the piston (not shown) of the air cylinder 54, the said jaws 46 will be rocked about pivots 56 and 57 in the known manner toward each other, the jaws each being returned to open position by air pressure. The jaws 46 are normally held in open position as shown in FIGURE 4 against stops 58.

In the operation of the apparatus thus far described, the operator starts rotation of the motor 41 in a direction to lower the elevator 20. Upon the same having been lowered a sufficient distance to position the pins 52 at a horizontal level to extend beneath the top rows of billets B as indicated in broken lines 52'' in FIGURE 2, the air cylinder 54 is actuated to close the jaws 46 which will position pins 52 inwardly of the ends of billets B. The motor 41 may now be actuated to operate the mechanism of hoist 36 to raise the elevator. The pins 52 will engage the billets B and carry the same upwardly to later be disposed on tracks 60 (see FIGURES 1 and 4) for rolling therefrom onto tracks 11.

As will be seen in FIGURES 1 and 4, the tracks 60 when in operating position are in the path of movement of the billets at the time the elevator is being lowered to the pallet 43. Thus the tracks necessarily must be removed from said path. To this end, the tracks 60 are separately mounted and each is secured to brackets 61 which are pivotally attached as at 62 to the lower ends of vertical members 23 of the elevator to move therewith and swing about the said pivot 62. Each bracket 61 extends outwardly of its pivot 62 as at 63 and carries a roller 64 which is normally held against a stop abutment 65 attached to the uprights 12 and 13 of the frame F. In the raised position of the elevator 20 (see FIGURE 4), the rollers 64 to engage the abutments 65 and the tracks are held thereby in position beneath the billets to support them, the tracks 60 being inclined for the billets to roll therealong onto tracks 11. As the elevator 20 decends, the rollers 64 will disengage the stationary abutments 65. The brackets 61 being weighted by tracks 60 upon being free of abutments 65 swing by gravity about pivots 62 in a clockwise and counterclockwise direction respectively as seen in FIGURE 4 and carry the tracks 60 therewith to a position out of the path of movement of the elevator toward billets B. At the upper end portion of the travel of the elevator and billets, the rollers 64 will re-engage abutments 65 to swing brackets 61 in the direction to move the tracks 60 beneath the billets and upwardly to lift the billets from the pins 52 and support the same on the tracks 60. The jaws are thus free and released from the billets and may be withdrawn. The billets are free to roll along the inclined tracks toward the machine.

Figure 9:
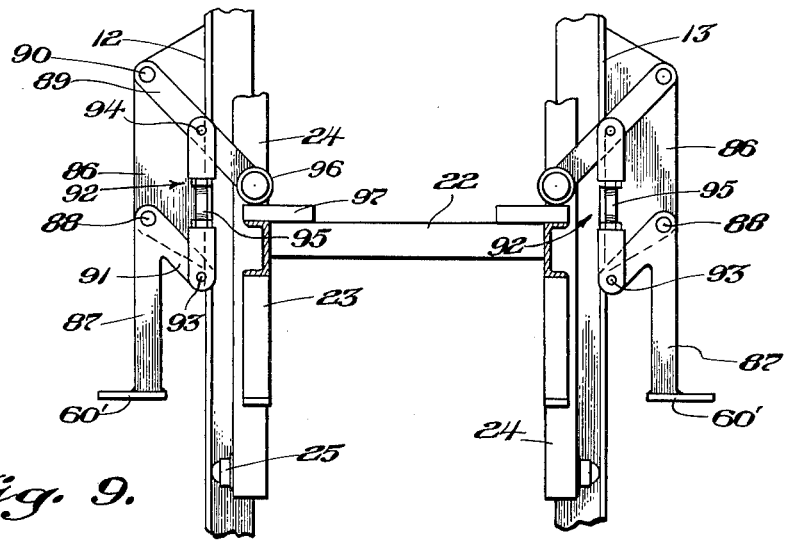
FIGURE 9 is a sectional view largely diagrammatic with parts omitted to show in one position an alternate mounting of the tracks for discharging the billets.
Figure 10:
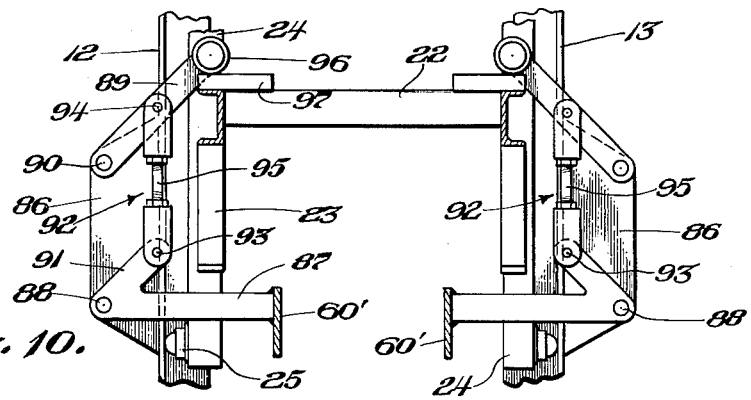
FIGURE 10 is a view smiliar to FIGURE 9 showing the tracks in a different position.
Figure 11:
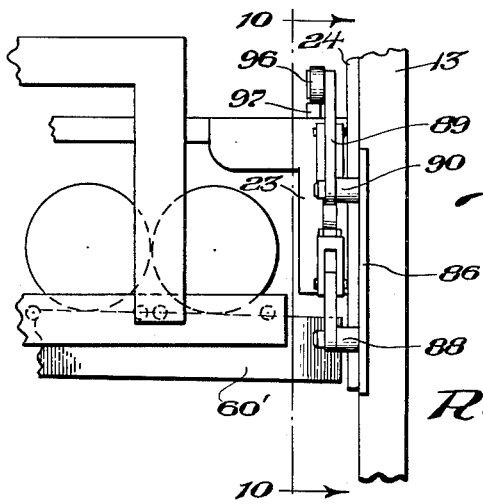
FIGURE 11 is a fragmental view of the frame and elevator taken at right angles to the showing in FIGURE 10.

The tracks shown at 60 in the figures heretofore described may be alternately mounted as shown in FIGURES 9 and 10, and in these figures there projects from the side frames 12 and 13 brackets 86. At the lower portion of each bracket 86, an arm 87 is pivoted at 88 which supports at its inner end one of the tracks 60'. Thus, this track is pivotally mounted on the frame F rather than on the elevator as above described. A lever 89 is pivoted at 90 on this bracket 86 at a location above the pivot 88 and this lever is connected to a branch arm 91 integral with arm 87 by means of a link 92 which is pivoted as at 93 at the end of the branch arm 91 and at 94 intermediate the ends of the lever 89. This link is in three parts, the end parts being pivoted on the pivots 93 and 94 and the mid portion 95 connecting the two end parts by right and left hand screw and nut connections so that the effective length of the link may be adjusted in turnbuckle fashion. The inner ends of the levers 89 carry rollers 96 which are in the path of movement of the elevator and are so positioned as to engage portions 97 of the elevator such as the members 22 so that as the elevator rises with its load of billets, this platform portion will engage the rollers 96 of levers 89 in their lower position as shown in FIGURE 9 and raise the levers 89 and consequently the tracks 60' from the position shown in FIGURE 9 to the position shown in FIGURE 10 in which position the tracks 60' will have swung upwardly so as to lift the billets from the elevator and support them upon the tracks 60' and these tracks, as heretofore above described, being inclined and being free from the jaws will cause the billets to roll along the tracks 60' onto the tracks 11 and thus into the operating machine.

Figure 8:
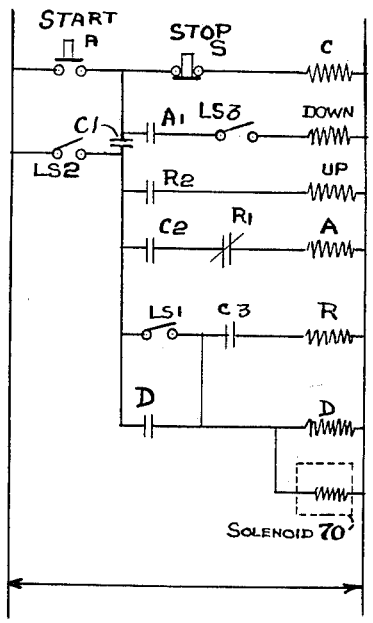
FIGURE 8 is a diagram of an electric circuit in which is positioned various electrically operated control elements of the apparatus.

The apparatus is automatically operated, and to this end the electric control device is shown in FIGURE 8 which will be described in the description of the automatic operation of the apparatus 10.

Figure 7:
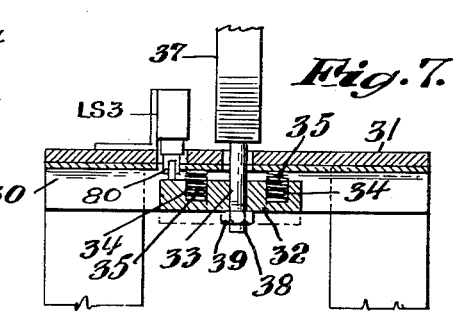
FIGURE 7 is a sectional view of a construction detail of the apparatus.

At the start of the operation, the elevator is empty and in the raised position, and the jaws 46 are open (see FIGURE 1). Electric switch LS2 is in the open relation by reason of being held in contact with an abutment 67 carried by a guide 24. Switch LS1 is normally open, and normally open safety switch LS3 is held closed by the operating arm 80 (FIGURE 7). The operator pushes button A of electric starter switch 68 (see FIGURE 2). This closes the circuit to energize relay C which closes contacts C1, C2 and C3 to close the circuit to relay A so as to energize the circuit of motor 41 in the direction to operate hoist 36 to lower elevator 20. Upon the elevator moving down a distance sufficient to free the actuator of switch LS2 from abutment 67 carried by the elevator, switch LS2 will close and the operator may release button A, the circuit to relay C remaining closed through switch LS2 and contacts C1.

Upon the elevator having lowered to a position to have the jaws 46 moved into engagement with the billets B to be carried upwardly thereby, the actuator arm 69 (FIGURE 3) of electric switch LS1 will have contacted one of the billets of the uppermost row and moved to closed relation to energize relay R, contacts C3 remaining closed, to open contacts R1 which releases relay A opening contact A1 to arrest the motor 41. The closing of switch LS1 also energizes relay D and solenoid 70' of a solenoid operated valve 70 (see FIGURE 2) through which air under pressure is supplied to air cylinder 54 to the side of the piston thereof to move the piston rod outwardly to close the jaws 46 about the billets B. Solenoid 70' remains energized through holding contacts D. Energizing of relay R also closes contacts R2 thereby energizing the motor 41 in the direction to operate the hoist 36 and raise the elevator 20. Upon the elevator having reached its upper position, switch LS2 is moved to open position so as to de-energize the entire circuit. Valve 70 is a four way single solenoid, spring return valve and is returned to initial position when de-energized by LS2, to move the jaws to open position so as to release the billets on the tracks 60 which have been swung to a billet supporting position as heretofore described. As safety features the circuit may be opened at any instant of the operation of the apparatus by pushing the stop button S of switch 68. Switch LS3 is also a safety switch which is operable to open the circuit should some jam occur in the lowering of the elevator. To this end, switch LS3 is mounted on the upper portion of the elevator 20 and the operating arm 80 thereof (see FIGURE 7) extends through bar 31 and channel 30 so as to engage block 32 which is normally held by the hoist 36 during proper operation thereof. Should some action take place to prevent reversal of the motor 41 to raise the elevator at the end of the downward stroke or should there be an interruption of lowering of the elevator 20 with the motor 41 still energized, the continued pay out of the hoist cable will release the tension on the block 32, which will move outwardly under pressure of springs 35. Therefore, arm 80 of switch LS3 opens the switch and thus the circuit to the motor 41.

I claim:

1. An apparatus for feeding cylindrical work comprising a work support, guide means rising vertically from said support, elevator means guided thereby, means for vertically reciprocating said elevator means above the work support, jaws carried by the elevator means to engage the work while on said support to pick the same up as the elevator moves upwardly, and continuous tracks pivoted on one of said means to move to and from a position in the path of movement of the work when carried by said elevator means and so located as to engage the work at spaced points less than the length of the work and at substantially right angles to the work and an abutment on the other of said means to be engaged by a part movable with the elevator means for causing swinging movement of the tracks into a position to engage the work and lift it from the elevator means during the upward movement of the elevator, said tracks being inclined so that cylindrical work will roll along said tracks from the path of movement of the elevator means.

2. An apparatus for feeding cylindrical work as in claim 1 wherein the tracks are on the elevator means and the abutment is on the guide means.

3. An apparatus for feeding cylindrical work as in claim 1 wherein the tracks are on the guide means and the abutment is on the elevator means.

4. An apparatus for feeding cylindrical work as in claim 1 wherein there is provided automatic means to successively cause, after the elevator is started downward, the elevator to stop, the jaws to engage the work, the elevator to rise and the tracks to lift the work from the jaws and then the elevator to stop.

5. A feeding apparatus comprising a work support for a plurality of cylindrical work pieces arranged in a horizontal row, an elevator above said support, jaws carried by said elevator each having a plurality of pins spaced apart a distance less than the diameter of the work pieces and mounted to move endwise of the work beneath the work so as to engage and carry the cylindrical work upwardly as the elevator moves upwardly and continuous tracks pivotally mounted and carried by the elevator to swing from locations spaced from the path and beneath the work of the work pieces into said path to lift said work pieces from said jaws as the elevator moves upwardly.

6. An apparatus as in claim 5 wherein the tracks are inclined so that the cylindrical work will roll along said tracks from the elevator.

References Cited in the file of this patent

UNITED STATES PATENTS

| | | |
|---|---|---|
| 1,818,584 | Schroeder | Aug. 11, 1931 |
| 1,901,360 | Snow | Mar. 14, 1933 |
| 2,108,457 | Tobia | Feb. 15, 1938 |
| 2,194,125 | Rinehart | Mar. 19, 1940 |
| 2,217,983 | Hopkins | Oct. 15, 1940 |
| 2,546,374 | Rayburn | Mar. 27, 1951 |
| 2,767,865 | Lasater | Oct. 23, 1956 |